Jan. 27, 1970 P. ZEMAN 3,491,868
UPENDING CONVEYOR
Filed June 10, 1968 4 Sheets-Sheet 1

INVENTOR:
PAUL ZEMAN,
BY Matthew P. Lynch
ATTORNEY

Jan. 27, 1970   P. ZEMAN   3,491,868
UPENDING CONVEYOR
Filed June 10, 1968   4 Sheets-Sheet 2

INVENTOR:
PAUL ZEMAN,
BY Matthew P. Lynch
ATTORNEY

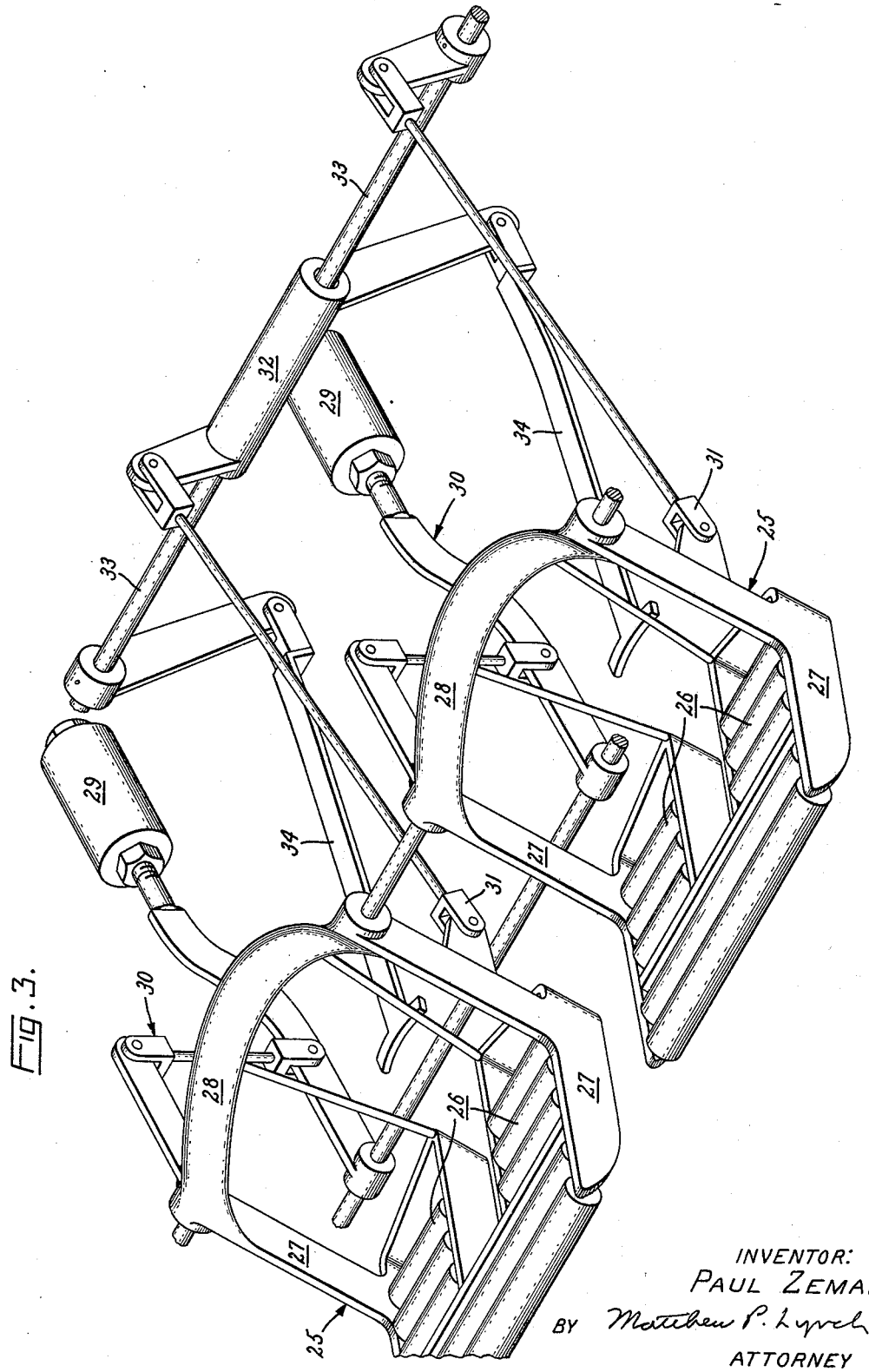

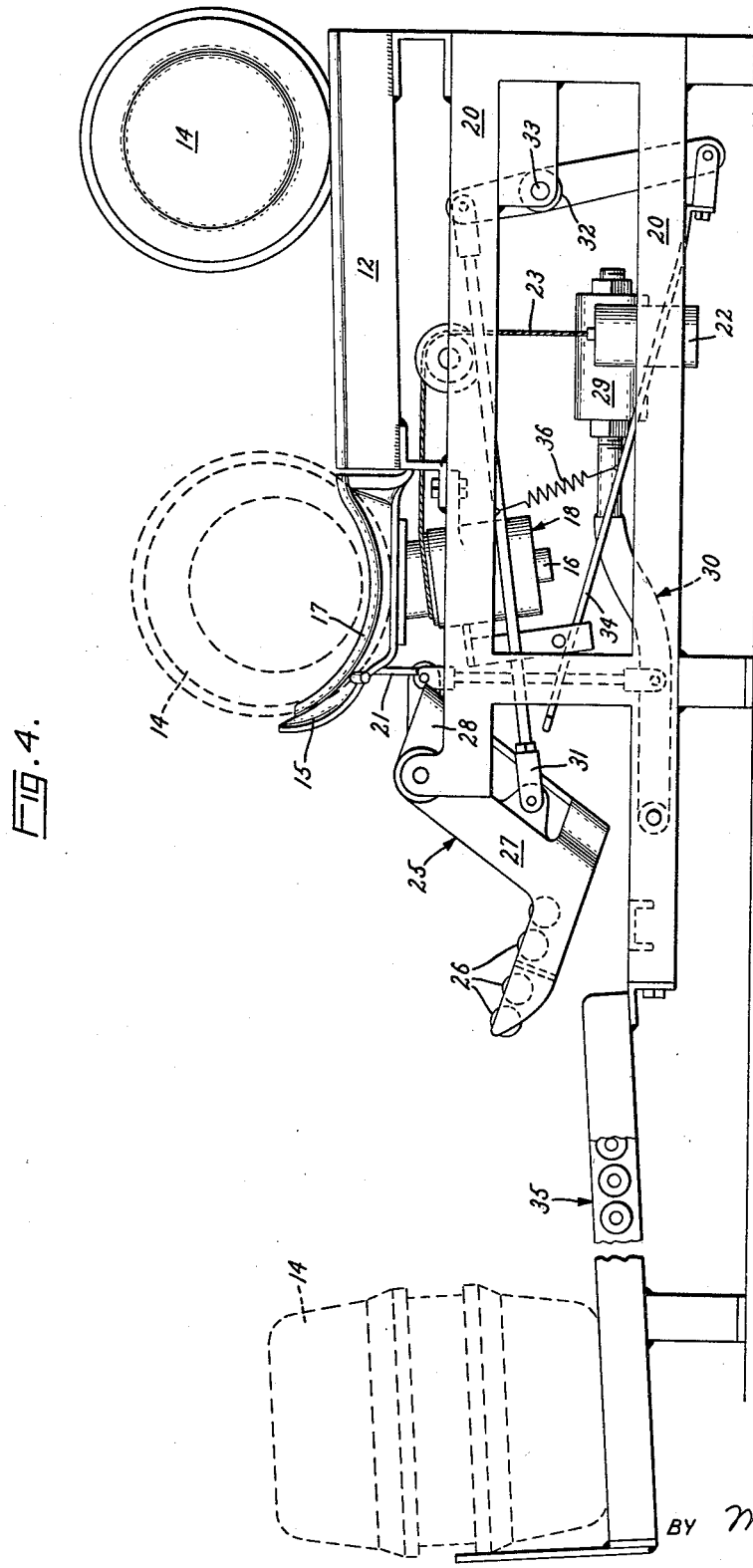

United States Patent Office

3,491,868
Patented Jan. 27, 1970

3,491,868
UPENDING CONVEYOR
Paul Zeman, 144—44 32nd Ave.,
Flushing, N.Y. 11354
Filed June 10, 1968, Ser. No. 735,700
Int. Cl. B65g 11/20, 47/24
U.S. Cl. 193—43                    8 Claims

ABSTRACT OF THE DISCLOSURE

A barrel in a prone position enters a cradle that is pivotally mounted on a skewed axis, the weight of the barrel causes the cradle to rotate by offsetitng its center of gravity. The rotation of the cradle causes the barrel to be upended from a prone to a vertical position and be deposited on a pivotal roller gate. The weight of the barrel causes the gate to move actuating a linkage which causes a push rod to push an adjacent barrel off its respective roller gate onto a roller conveyor.

FIELD OF THE INVENTION

Figure 1:
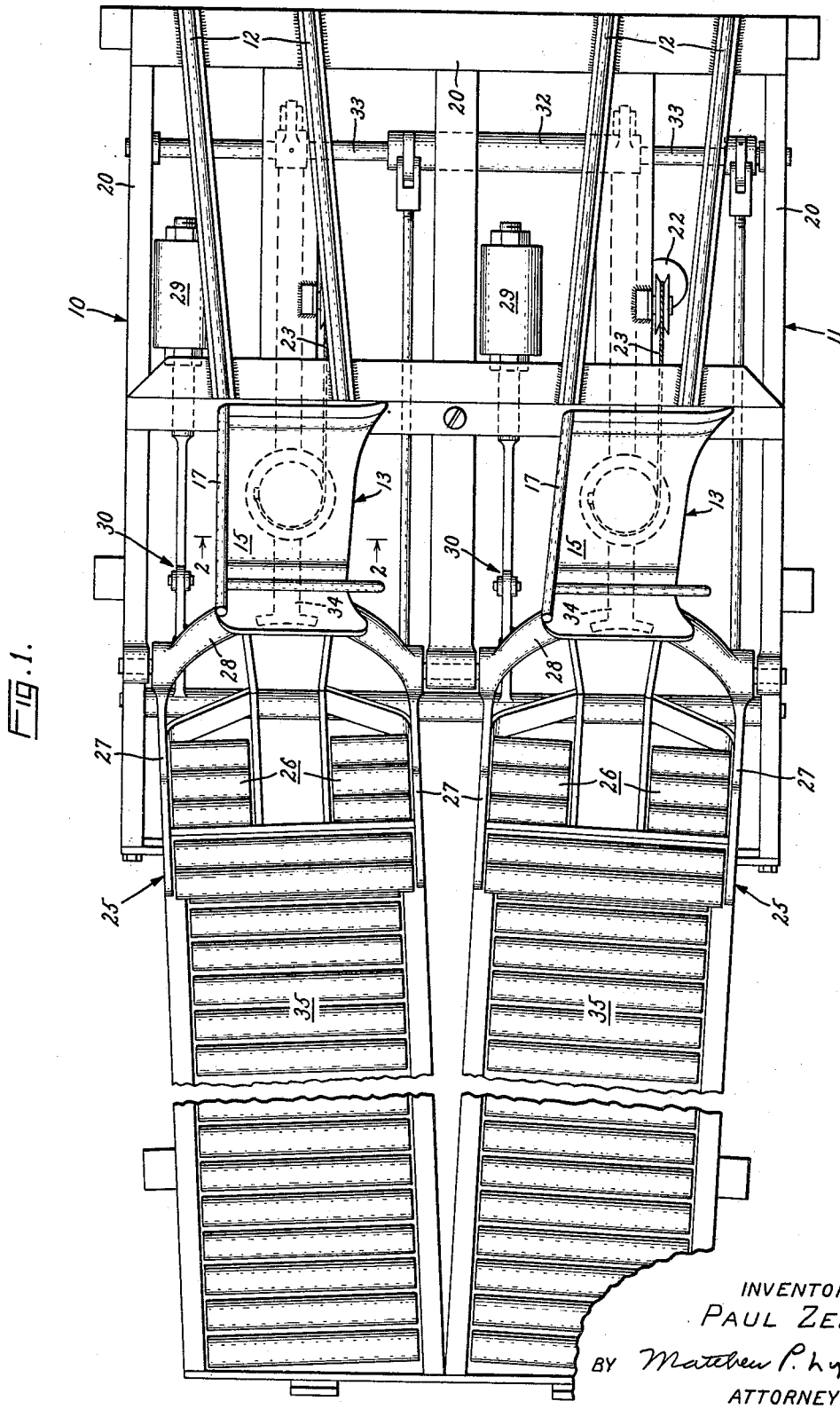

This invention relates to an upending conveyor for barrels and, more particularly, to an apparatus for receiving barrels or other objects from a conveyor in a horizontal or prone position and upending the barrels to a vertical or upright position quickly and easily. In a more specific aspect, the invention relates to an upending conveyor for upending barrels from a horizontal to a vertical position, the upending conveyor having a cradle that is mounted on a skewed axis. The cradle rotates about its skewed axis in response to a change in its center of gravity due to the weight of the barrel, thereby causing the barrel to be upended from a prone to an upright position.

PRIOR ART

In breweries and the like, where large numbers of barrels are used or handled, they are often allowed to travel by gravity from one part of the factory to another, rails or chutes being employed to guide the barrels in their travel. In the usual operation of a brewery, it is desirable that the barrels or kegs being conveyed by gravity for loading or for placement in storage be disposed in a horizontal or prone position on the conveyors provided for such purposes so as to facilitate the movement and routing of the barrels. Subsequently, however, the barrels are preferably arranged in vertical or erect positions, that is, standing on ends thereof, for transport in multi-row, pallet-sized groupings, as by a fork-lift truck, either into storage or into trucks so that such groupings will occupy a minimum of floor space and can be stacked.

Complex apparatus have been developed, as described in U.S. Patents 2,848,124 and 3,301,380 to D. S. Angell et al. and E. R. Schickle, respectively, for accomplishing the upending of barrels. However, such apparatus require a high degree of sophisticated maintenance to keep their complex electrical circuitry in repair and are very expensive to construct and operate.

SUMMARY OF THE INVENTION

In accordance with the present invention, as applied to the rotation of a barrel from one axial position to another, an arcuate cradle is pivotally mounted by a shaft having a skewed axis relative to the cradle. The invention may be used satisfactorily in connection with any type of container, but it is particularly adapted for handling cylindrical containers such as barrels. For the purpose of convenience, the following disclosure will be made with reference to barrels; however, this should not be considered as a limitation upon the scope of the invention. Additionally, while the description will be limited to the upending of a barrel from a horizontal position to a vertical position, it should be understood that the barrel can be rotated from a vertical or semi-vertical position to a horizontal position.

The skewed cradle is positioned, when empty, by a counterweight, to receive a barrel in a horizontal position. The barrel, upon entering the cradle, changes the cradle's center of gravity and causes it to rotate approximately 90 degrees. The rotation of the cradle containing the barrel causes the barrel to be rotated from a horizontal to a vertical position and be deposited upon a pivotal roller gate. The pivotal roller gate is retained in an inclined position to receive the barrel by another counterweight. When the weight of the barrel overcomes the weight of the gate's counterweight, the roller gate pivots, allowing the barrel to roll onto a roller conveyor. In addition to allowing the barrel to roll onto the roller conveyor, the pivoting roller gate actuates a push rod which pushes any barrels in an adjacent upending conveyor off its roller gate, allowing the gate to return to its inclined barrel-receiving position.

THE DRAWINGS

Figure 2:
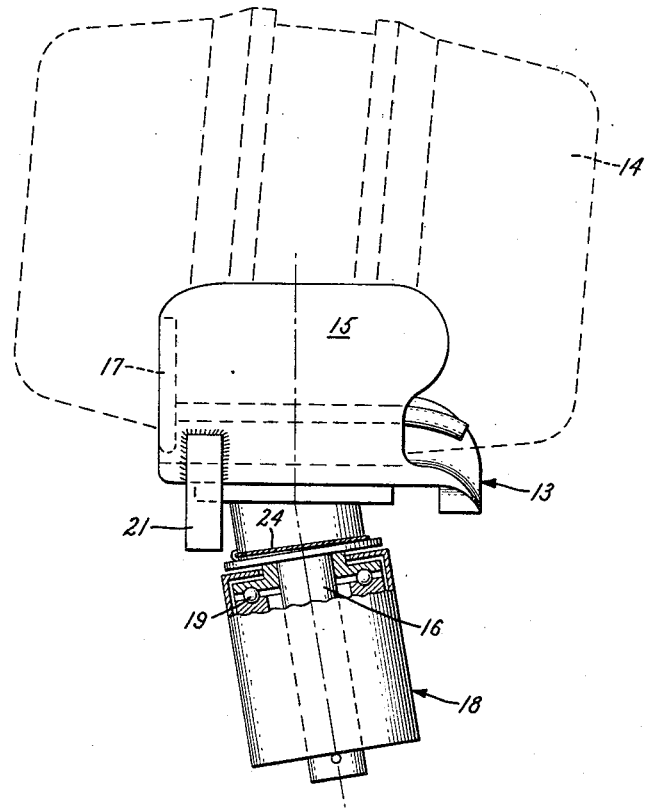

FIG. 1 is a plan view of the upending conveyor;
FIG. 2 is a partial cut away view of the cradle and its skewed mounting;
FIG. 3 is a perspective view of the pivotal roller gate and its associated push rod linkage;
FIG. 4 is a side view of the upending conveyor and
FIG. 5 is a side view of the cradle and roller gate during the upending process.

DESCRIPTION OF THE PREFERRED EMBODIMENTS

Figure 5:
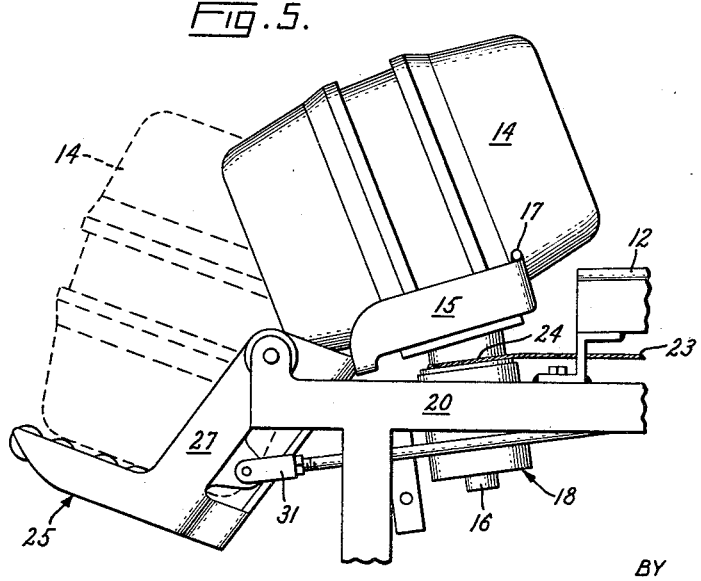

Referring now to the drawings, wherein like reference numbers designate like or corresponding parts throughout the several views, there is shown in FIGS. 1 and 5 an upending conveyor in accordance with the applicants' invention; the conveyor comprises two conveyor lines 10 and 11 mounted side by side upon a support frame 20. Since both conveyor lines are substantially identical, only one will be described for the sake of ease of understanding. It should be realized, however, that one conveyor line or a plurality of conveyor lines can be utilized without departing from the spirit of the present invention.

A pair of parallel guides 12 are separated by a distance sufficient to support a barrel 14 in a prone position and mounted adjacent a cradle 13. The barrel 14 rolls under the force of gravity over the guides 12 which are mounted on a slight incline towards the cradle 13.

The cradle 13, as illustrated in FIGS. 2 and 4, has an arcuate cup portion 15 and a skewed shaft 16. One side of the arcuate cup portion 15 is disposed adjacent to and slightly below the ends of the guides 12. The opposite side of the arcuate cup portion 15 curves upwardly above the level of the guides 12. By disposing one side of the cup 15 below the level of the guides 12 and the opposite side above the level of the guides 12, the barrel 14 will roll off the end of the guides 12 into the cup 15 and be retained therein by the higher side. Interconnecting both sides of the arcuate cup 15 is a retainirg bar 17. The retaining bar 17 serves to both hold the barrel 14 within the cup 15 and simultaneously position the barrel 14 as it enters the cup 15.

Disposed adjacent and below the ends of the guides 12 on the support frame 20 is a support means 18. The support means 18 has a bearing arrangement 19 which is adapted to receive the skewed shaft 16 of the cradle 13. The support means 18 is mounted on a slight angle relative to a plane extending along the longitudinal axis of the conveyor line 10. The angle of the support means 18 is substantially the same as the angle of the skewed shaft 16 so that when the shaft 16 is disposed within the bearing arrangement 19 in the support means 18, the cradle 13 is substantially in planar juxtaposition to the guides 12.

When the skewed shaft 16 is mounted within the support means 18 by the bearing arrangement 19, the cradle 13 is capable of rotating about the support means 18. When the barrel 14 enters the cradle 13, the weight of the barrel 14 causes a change in the position of the center of gravity of the cradle 13. The change in the center of gravity of the cradle causes the cradle 13 to rotate about the support means 18. In the illustrated embodiment, the cradle 13 will rotate in a clockwise direction due to the inclination of the skewed shaft 16 and support means 18. If desired, the cradle 13 can be adapted to rotate in a counter-clockwise direction by inclining the shaft 16 and support means 18 in the opposite direction.

The amount of rotation of the cradle 13 due to the weight of the barrel 14 is controlled by a member 21, which extends from the cradle 13 and is adapted to engaged a portion of the frame 20 when the cradle 13 has rotated a predetermined number of degrees. The member 21 can be positioned to limit the rotation of the cradle 13 to a varying number of degrees; however, for the purposes of description in the preferred embodiment, the member 21 is positioned to limit the rotation of the cradle 13 to approximately 90 degrees.

In order to ensure that the cradle 13 will return to its initial position to receive another barrel after the original barrel has caused the cradle to rotate, a counterweight 22 is secured by a cable 23 about a cylindrical member 24 secured to the bottom of the cup 15. As the cradle 13 rotates, the cable 23 wraps about the member 24 so that when the barrel 14 is removed from the cradle 13, the counterweight overcomes the weight of the empty cradle and causes the cradle to rotate in an opposite direction to return to its initial barrel-receiving position. The return rotation of the cradle 13 is limited by the abutment of one side of the cup 15 with the support frame 20. Obviously, a number of other devices such as a spring arrangement can be utilized to return the cradle 13 to its initial position.

Disposed adjacent the high side of the cup 15 at a level below the guides 12 is a roller gate 25. The roller gate 25, as illustrated in FIG. 3, comprises a plurality of rollers 26 rotatably secured between a substantially L-shaped frame 27. The upwardly extending legs of the frame 27 are pivotally secured to the support frame 20 and are interconnected by an arcuate member 28 which serves as a back rest for the barrel 14 when the barrel is on the gate 25. A counterweight 29 is secured to the frame 27 by suitable linkage 30 and maintains the roller gate 25 at an incline relative to the horizontal plane as shown in FIGS. 4 and 5.

One end of a rod-and-clevis arrangement 31 is secured intermediate the ends of one of the upwardly extending legs of the frame 27. The opposite end of the rod-and-clevis arrangement 31 is secured to one end of a bell crank 32 which is adapted to rotate about a shaft 33 extending between the sides of the support frame 20 below the parallel guides 12. The opposite free end of the bell crank 32 extends back towards the roller gate 25 and provides a push rod 34. The push rod 34 which is actuated by the roller gate 25 in conveyor line 10 is aligned with conveyor line 11 and the push rod 34 which is actuated by the roller gate 25 in conveyor line 11 is aligned with conveyor line 10. A spring 36 is secured between the frame 20 and the push rod 34 as shown in FIG. 4. in order to align the push rod 34 so that it will remain in alignment with a barrel on the roller gate 25. The spring 36 additionally allows the push rod 34 to move without being bent if a barrel should come down on top of it.

Extending outwardly from a point adjacent the free end of the roller gate 25 is a roller conveyor 35. The roller conveyor 35 is mounted on a slight incline relative to a horizontal plane so that the barrel 14 will be caused to move away from the roller gate 25 due to the force of gravity.

In operation, the barrel 14 is placed in a horizontal or prone position on the parallel guides 12. The barrel 14 rolls down the guides 12 and enters the cup portion 15 of the cradle 13. As the barrel 14 enters the cup 15, it is retained within the cup 15 by the upwardly extending side portion and positioned within the cup 15 by the retaining bar 17. Because the cradle 13 is mounted on a skewed axis, the weight of the barrel 14 in the cup 15 causes a change in the position of the center of gravity of the cradle 13. The change or offsetting of the cradle's center of gravity causes the cradle 13 to rotate in a clockwise direction about the support means 18. The rotation of the cradle 13 causes the barrel 14 to also rotate and deposits the barrel on end on the roller gate 25. The weight of the now vertically upended barrel overcomes the counterweight 29 and causes the roller gate 25 to pivot about its pivotal support. When the barrel 14 leaves the cradle 13, the counterweight 22 causes the cradle 13 to return to its original barrel-receiving position by rotating in a counter-clockwise direction. When the roller gate 25 pivots, the push rod 34 gives the barrel 14 in the adjoining conveyor line a slight push causing the barrel 14 to roll down the roller conveyor 35. When the next barrel enters the adjoining conveyor line, the roller gate 25 in that conveyor line actuates the push rod 34 pushing the barrel on the present roller gate 25 onto its adjacent roller conveyor 35 and so on. During the operation, the rotation of the cradle 13 in a clockwise direction is limited by the engagement of the member 21 with the frame 20. The rotation of the cradle 13 to its original barrel-receiving position is limited by the engagement of the cup 15 with the frame 20.

An advantage of this invention is that the entire upending conveyor is entirely mechanically operated and has no electrical or hydraulic connections or mechanisms with their attendant disadvantages. Another advantage is that a simple, compact, efficient apparatus for upending barrels from a horizontal to a vertical position has been invented that is completely automatic in operation. A further advantage is the full utilization of gravity as a moving force. A still further advantage is the incorporation of a positive mechanism for causing the barrels to be pushed off the roller gates onto the roller conveyor. Another advantage is the adaptability of the upending conveyor to barrels and containers of varying sizes. Still another advantage is the adaptability of the cradle to rotate in any direction due to the change in its center of gravity and the angle and direction of its skewed mounting.

For the purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:
1. An upending conveyor comprising in combination:
   a support frame;
   a conveyor line mounted on said support frame;
   a support means mounted adjacent one end of said conveyor line;
   a cradle having a skewed shaft, said skewed shaft rotatably supported by said support means, said cradle adapted to rotate about said skewed shaft when its center of gravity is offset by the weight of a barrel received from said conveyor line, the rotation of said cradle causing the barrel to be rotated from a prone to an upright position;
   a roller gate pivotally secured to said support frame adjacent said cradle, said roller gate adapted to receive the upended barrel from said cradle, the weight of the upended barrel causing said roller gate to pivot downwardly; and a roller conveyor adjacent said roller gate, said roller conveyor adapted to receive the barrel from said roller gate subsequent to the downward pivotal movement of said gate.

2. An upending conveyor in accordance with claim 1 further comprising:

a push rod; and means interconnecting said push rod and said roller gate whereby said push rod can push a barrel off a roller gate of an adjacent upending conveyor when said interconnected roller gate is pivoted downwardly.

3. An upending conveyor in accordance with claim 1 further comprising means for causing said cradle to return to its original position after said upended barrel is removed.

4. An upending conveyor in accordance with claim 1 further comprising means for causing said roller gate to return to its original position after said upended barrel is removed.

5. An upending conveyor in accordance with claim 1 further comprising means secured to said cradle for positioning a barrel, received from said conveyor line, within said cradle whereby the center of gravity of said cradle is offset by the weight of said barrel.

6. An upending conveyor in accordance with claim 1 further comprising means for limiting the rotation of said cradle whereby said barrel is deposited in an upended position upon said roller gate.

7. An upending conveyor in accordance with claim 1 wherein said conveyor line is inclined towards said cradle and said roller conveyor is inclined away from said cradle.

8. An upending conveyor in accordance with claim 1 wherein said conveyor line and said roller conveyor are disposed in a common vertical plane.

References Cited

UNITED STATES PATENTS

| | | | |
|---|---|---|---|
| 2,848,124 | 8/1958 | Angeu et al. | 214—91 |
| 3,301,380 | 1/1967 | Schickle | 198—33 |

ANDRES H. NIELSEN, Primary Examiner

U.S. Cl. X.R.

198—33